US009256826B2

(12) United States Patent
Srinivasan et al.

(10) Patent No.: US 9,256,826 B2
(45) Date of Patent: Feb. 9, 2016

(54) PREDICTING REACTIONS TO SHORT-TEXT POSTS

(71) Applicant: Adobe Systems Incorporated, San Jose, CA (US)

(72) Inventors: Balaji Vasan Srinivasan, Chennai (IN); Anandhavelu Natarajan, Kangayam (IN); Ritwik Sinha, Kolkata (IN); Vineet Gupta, Kanpur (IN); Shriram V. Revankar, Bangalore (IN); Balaraman Ravindran, Chennai (IN)

(73) Assignee: Adobe Systems Incorporated, San Jose, CA (US)

( * ) Notice: Subject to any disclaimer, the term of this patent is extended or adjusted under 35 U.S.C. 154(b) by 264 days.

(21) Appl. No.: 13/967,229

(22) Filed: Aug. 14, 2013

(65) Prior Publication Data

US 2015/0052087 A1  Feb. 19, 2015

(51) Int. Cl.
*G06N 5/02* (2006.01)
*G06N 99/00* (2010.01)

(52) U.S. Cl.
CPC ............... *G06N 5/02* (2013.01); *G06N 99/005* (2013.01)

(58) Field of Classification Search
CPC ........ G06N 5/02; G06N 99/005; G06N 99/00
USPC .................................................... 706/12, 46
See application file for complete search history.

(56) References Cited

U.S. PATENT DOCUMENTS

| | | | |
|---|---|---|---|
| 2011/0258256 A1* | 10/2011 | Huberman et al. | 709/204 |
| 2011/0302103 A1* | 12/2011 | Carmel et al. | 705/347 |
| 2012/0150773 A1* | 6/2012 | DiCorpo et al. | 706/12 |
| 2013/0041860 A1* | 2/2013 | Lawrence et al. | 706/46 |
| 2013/0129188 A1* | 5/2013 | Zhang et al. | 382/144 |
| 2013/0159219 A1* | 6/2013 | Pantel et al. | 706/12 |
| 2013/0297553 A1* | 11/2013 | Bierner | 706/52 |
| 2013/0346496 A1* | 12/2013 | Maarek et al. | 709/204 |
| 2014/0088944 A1* | 3/2014 | Natarajan et al. | 703/13 |
| 2014/0122622 A1* | 5/2014 | Castera et al. | 709/206 |
| 2014/0324758 A1* | 10/2014 | Diaz | 706/52 |

OTHER PUBLICATIONS

Artiz Y et al., "Predicting Responses to Microblog Posts", 2012 Conference of the North American Chapter of the Association for Computational Linguistics: Human Language Technologies, pp. 602-606, Montreal, Canada, Jun. 3-8, 2012.*
Srinivasan B. et al., "Will Your Facebook Post Be Engaging?", Ueo'13, Nov. 1, 2013, San Francisco, CA, USA, pp. 25-28. (Date precludes use).*
Yang L et al., "Analyzing and Predicting Not-Answered Questions in Community-Based Question Answering Services", Proceedings of the Twenty-Fifth AAAI Conference on Artificial Intelligence, 2011, pp. 1273-1278.*

(Continued)

*Primary Examiner* — Jeffrey A Gaffin
*Assistant Examiner* — Dave Misir
(74) *Attorney, Agent, or Firm* — Wolfe-SBMC (57) ABSTRACT

This document describes techniques for predicting reactions to short-text posts. In one or more implementations, a prediction model for short-text posts is generated from previous posts to a social network and responses to the posts by the social network community. Subsequently, the prediction model can be used to predict the social network community's reaction to a proposed post prior to the proposed post being posted to the social network.

20 Claims, 6 Drawing Sheets

(56) References Cited

OTHER PUBLICATIONS

Zaman T et al., "Predicting Information Spreading in Twitter", Workshop on computational social science and the wisdom of crowds, NIPs., vol. 104, No. 45., 2010. (Was listed on applicants' IDS, but not provided).*
Otsu "A Threshold Selection Method from Gray-Level Histograms", IEEE Trans. Sys., Man., Cyber. 1979, Jan. 1979, pp. 62-66.
Naveed et al.,"Bad News Travel Fast: A Content-based Analysis of Interestingness on Twitter", In: Proc. Web Science Conf, 2011, 2011, 7 pages.
Martineau et al.,"Delta TFIDF: An Improved Feature Space for Sentiment Analysis", Third AAAI International Conference on Weblogs and Social Media, May 2009, San Jose CA, May 2009, 4 pages.
Zaman et al.,"Predicting Information Spreading in Twitter", Workshop on Computational Social Science and the Wisdom of Crowds, NIPS 2010., 4 pages.
Hong et al.,"Predicting Popular Messages in Twitter", 20th international conference companion on World wide web (WWW), 2011, 2 pages.
Petrovic et al.,"RT to Win! Predicting Message Propagation in Twitter", In International Conference on Weblogs and Social Media (ICWSM) 2011, 4 pages.
Yu et al.,"Towards predicting popularity of social marketing messages", 4th International Conference on Social computing, behavioral-cultural modeling and prediction (SBP'11), 2011, pp. 317-324.
Yang et al.,"Understanding Retweeting Behaviors in Social Networks", 19th ACM international conference on Information and knowledge management, Oct. 2010, 4 pages.
"Adobe Social Analytics Dashboard", 2011, 1 page.
"Adobe Social Analytics Press Release", May 19, 2011, 3 pages.
"Non-Final Office Action", U.S. Appl. No. 13/625,193, Feb. 13, 2015, 10 pages.
Mishne,"Predicting Movie Sales from Blogger Sentiment", American Association for Artificial Intelligence, 2006, 4 pages.
Siersdorfer,"How Useful are Your Comments? Analyzing and Predicting YouTube Comments and Comment Ratings", Raleigh, North Carolina, USA, Apr. 26-30, 2010, 10 pages.
"DBpedia", Retrieved from <http://wiki.dbpedia.org/About> on Feb. 26, 2013, (Feb. 23, 2013), 3 pages.
Balasubramanyan, et al., "What pushes their buttons? Predicting comment polarity from the content of political blog posts", *Proceedings of the Workshop on Languages in Social Media*, (Jun. 2011), 7 pages.
Bouma, Gerlof "Normalized (Pointwise) Mutual Information in Collocation Extraction", *Proceedings of the Biennial GSCL Conferenc*, (2009), 11 pages.
Koh, et al., "ManiWordle: Providing Flexible Control over Wordle", *IEEE Transactions on Visualization and Computer Graphics*, vol. 16, Issue 6, (Nov. 2010), 8 pages.
Lee, et al., "SparkClouds: Visualizing Trends in Tag Clouds", *IEEE Educational Activities Department*, (Nov. 2010), 8 pages.
Miller, George A., "WordNet: A Lexical Database for English", *Communications of the ACM*, vol. 38, No. 11, (Nov. 1995), pp. 39-41.
Nigam, et al., "Using Maximum Entropy for Text Classification", *In IJCAI-99 Workshop on Machine Learning for Information Filtering*, (1999), 7 pages.
"Final Office Action", U.S. Appl. No. 13/625,193, Sep. 16, 2015, 14 pages.

* cited by examiner

PREDICTING REACTIONS TO SHORT-TEXT POSTS

BACKGROUND

Social media marketing enables businesses and marketers to quickly react and reach out to customers. For successful engagement with an online social network community, marketers would like to understand the community's preferences. Users of an online social network community, such as Facebook® (where users like a brand page) or Twitter® (where users follow a brand handle) get access to posts by a business on a "feed" by following, subscribing, or being a fan of the business. The users of the community have the option to either respond to these posts (using comments, likes, shares or "retweets") or ignore them. These responses, or their absence, provide information about this community's preferences. The community's reaction to a post may be measured by the number of responses to the post, in the form of likes, shares, comments, retweets, and the like. Thus, marketers and business would like to be able to predict the community's reaction to a post prior to the post being posted.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques for predicting reactions to short-text posts. In one or more implementations, a prediction model for short-text posts is generated from previous posts to a social network and responses to the posts by the social network community. Subsequently, the prediction model can be used to predict the social network community's reaction to a proposed post prior to the proposed post being posted to the social network.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

In social media marketing, marketers and businesses try to generate short-text posts that capture as much attention as possible from the online social network community. In online social networks such as Facebook® or Twitter®, the number of posts that receive a high number of responses are generally very low, and may fall in the top 10% of all posts made by the business or marketer. This scenario leads to a class imbalance, in which there is too little data in the region of the marketer's interest and a lot of data outside. The class imbalance makes it difficult to construct a prediction model that is able to predict whether or not a post will be popular.

This document describes techniques for predicting reactions to short-text posts. In one or more implementations, a prediction model for short-text posts is formed from previous posts to a social network and responses to the posts by the social network community. The prediction model can be formed by binning the previous posts into different post classes based on the number of responses received by each post. For example, posts that received a high number of responses from the social network community may be binned into a popular post class, whereas posts that received a low number of responses may be binned into an unpopular post class.

In some implementations, features may be extracted from the previous posts. The extracted features may include non-textual features such as a length of the post, a time of day or week of the post, a duration of time since the last post, a frequency of posts, a sentiment of posts, hotness of topic of the post, newness of topic of the post, and/or a type of the post. The extracted features can also include textual features, such as a differential term frequency-inverse document frequency (Diff-TFIDF) of the post.

A prediction model can then be formed by applying a learning model to the different post classes and the extracted features of the posts. For example, the learning model attempts to learn which of the extracted features cause a post to be classified as popular or unpopular.

Subsequently, the prediction model can be used to predict the social network community's reaction to a proposed post, prior to the proposed post being posted to the social network. To do so, features are extracted from the proposed post, and the prediction model is used to predict the post class. The predicted post class can then be used to predict the social network community's reaction to the proposed post. For example, if the popular post class is predicted, then it can be predicted that the proposed post will also be popular and receive a similar number of responses as were received by the posts in the popular post class.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
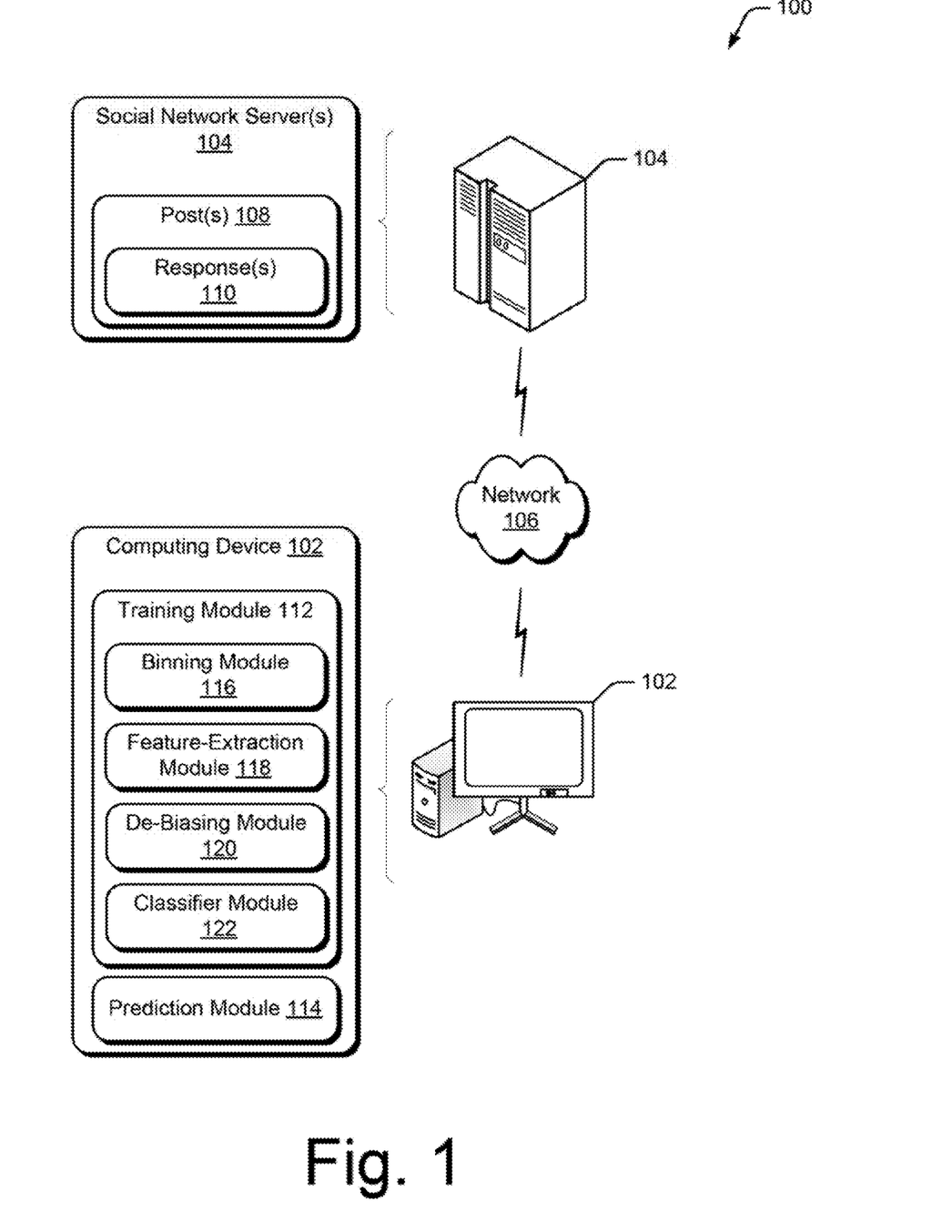
FIG. 1 illustrates an environment in an example implementation that is operable to employ techniques described herein.

FIG. 1 illustrates an environment 100 in an example implementation that is operable to employ techniques described herein. Environment 100 includes computing device 102 and social network server(s) 104 that are communicatively coupled via a network 106. Computing device 102 and social network servers 104 may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 6.

Although network 106 is illustrated as the Internet, the network may assume a wide variety of configurations. For example, network 106 may include a wide area network (WAN), a local area network (LAN), a wireless network, a public telephone network, an intranet, and so on. Further, although a single network 106 is shown, network 106 may also be configured to include multiple networks.

Social network server(s) 104 provide an interface (not shown) for multiple users to interact with a social network community over network 106. As described herein, a social network may include an online social platform, such as Facebook®, Twitter®, or Instagram®. In some cases, the social network community is composed of users that follow, subscribe, or are fans of a particular brand or company's page or handle on the social network.

User interactions with the social network community are recorded (stored) on social network servers 104. In some implementations, such user interactions with the social network community include short-text posts 108 posted to the social network, as well as responses 110 by the social network community to such posts. As described herein, short-text posts include any message published on an online forum or newsgroup and may include social posts on social platforms such as Facebook®, Twitter®, Instagram®, and the like, blogs, or marketing materials posted by enterprise marketers. In general, posts to social network communities may be shorter than other types of posts, such as blog posts, and thus may be considered short-text posts. For simplicity, however, short-text posts may also be referred to as "posts" herein. Responses 110, include any response to posts 108 by users of the social network community, including responding to or commenting on the post, liking, disliking, or loving the post, retweeting the post, sharing the post, favoriting the post, clicking on the post, selecting a like associated with the post, emailing the post, or any other tangible and measurable response to the post.

Computing device 102 is illustrated as including a training module 112 and a prediction module 114. Training module 112 is representative of functionality to process posts 108 and responses 110 received from social network servers 104 to form a prediction model. Prediction module 114 is representative of functionality that uses the prediction model to predict a reaction, by the social network community, to a proposed post prior to the proposed post being posted to the social network. Training module 112 may include a binning module 116, a feature-extraction module 118, a de-biasing module 120, and a classifier module 122. Further discussion of functionality of modules 112-122 is discussed below.

Figure 6:
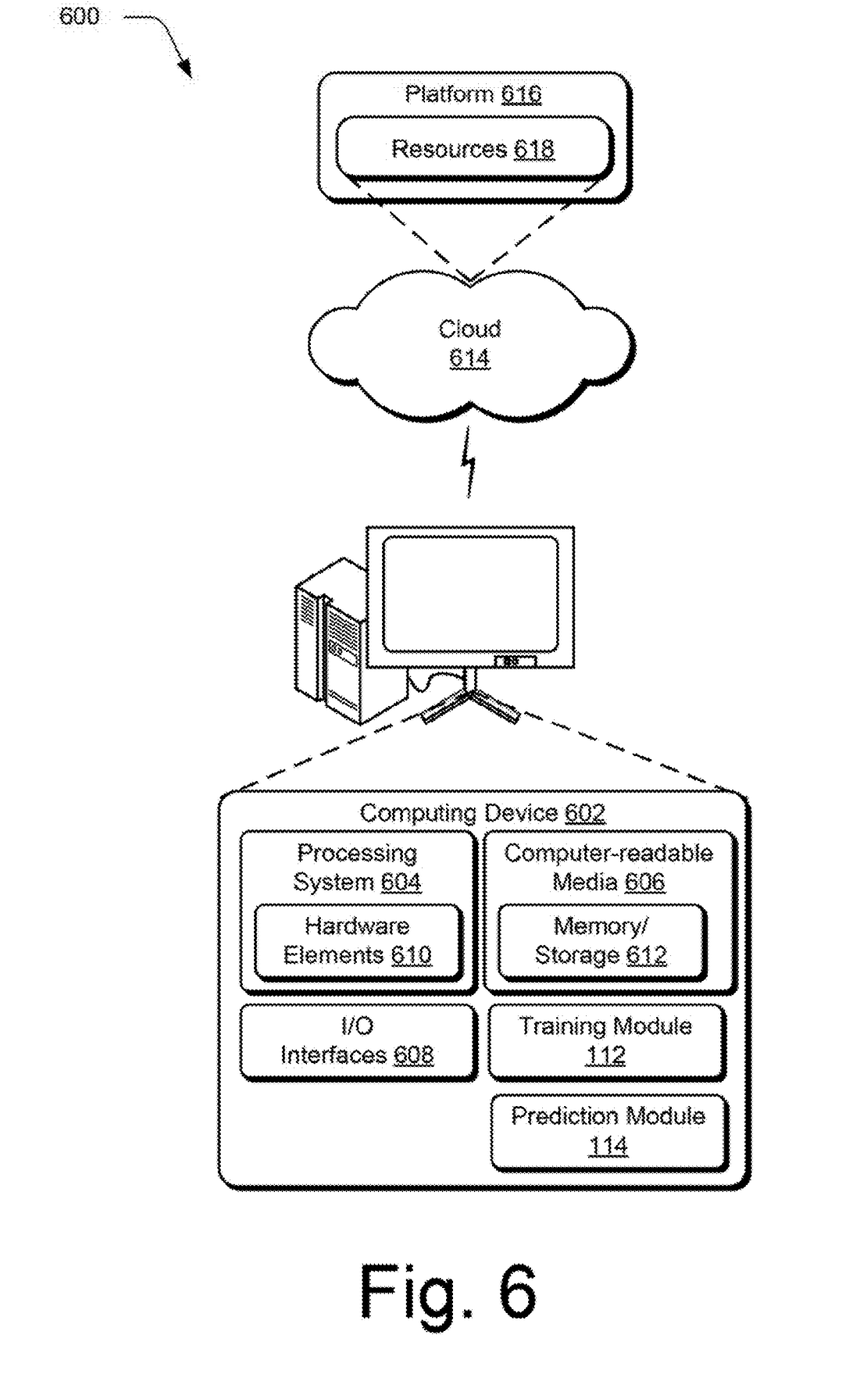
FIG. 6 illustrates an example system including various components of an example device that can be implemented as any type of computing device as described and/or utilized with reference to FIGS. 1-5 to implement embodiments of the techniques described herein.

Although illustrated as part of computing device 102, functionality represented by training module 112 and prediction module 114 may be further divided, such as to be performed "over the cloud" by one or more servers that are accessible via network 106, further discussion of which may be found in relation to FIG. 6. Further discussion of a training phase implemented by training module 112 may be found in the following description of FIG. 2, and further discussion of a prediction phase implemented by prediction module 114 may be found in the description of FIG. 4.

Figure 2:
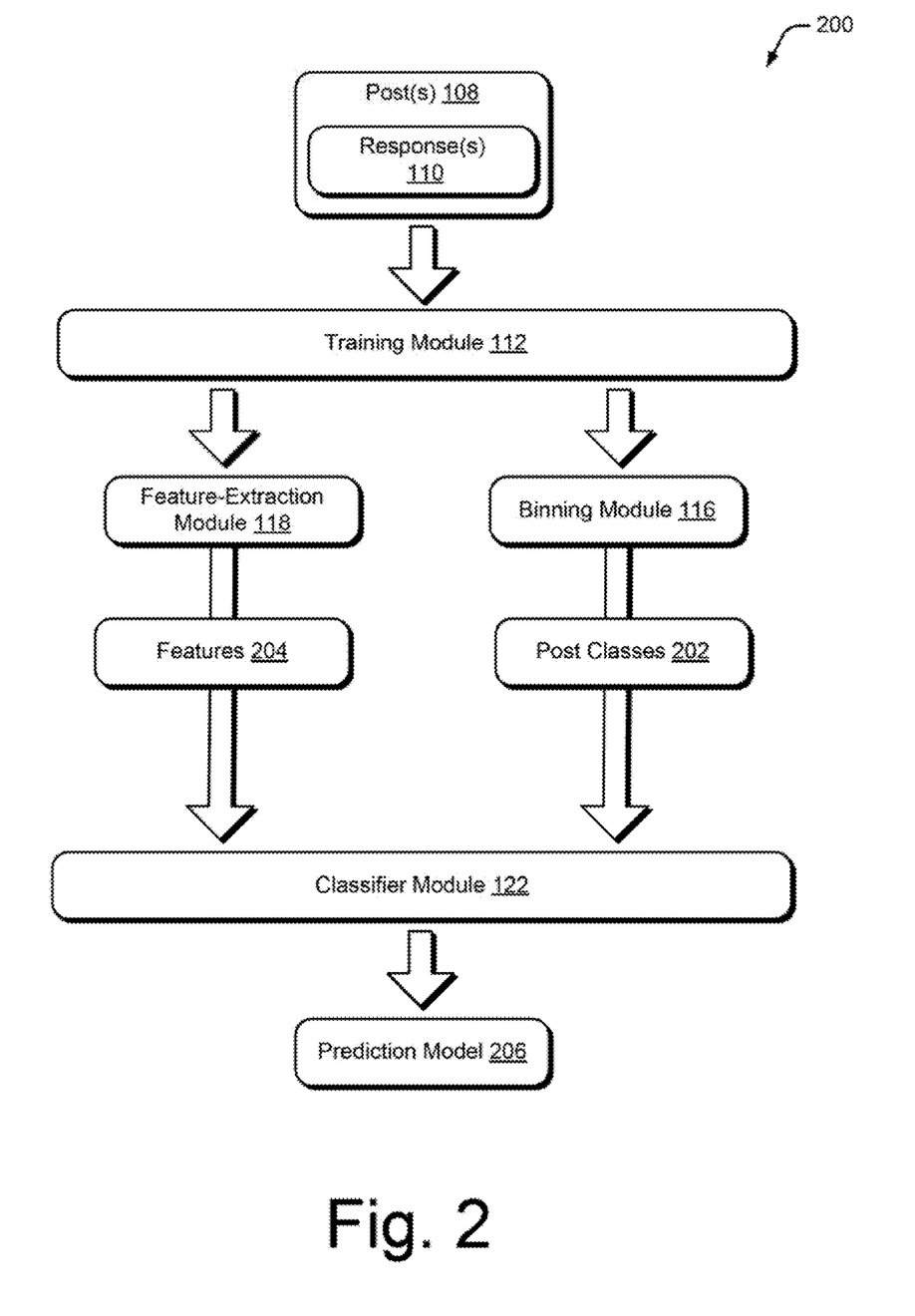
FIG. 2 illustrates a system in an example implementation in which a prediction model is formed.

FIG. 2 illustrates a system 200 in an example implementation in which a prediction model is formed. In this example, posts 108 and responses 110 to the posts are collected by training module 112 from social network servers 104. Posts 108 may have been previously posted by an entity to a particular social network. For example, a particular company, or brand, may have a "page" on Facebook® to which the company posts. As another example, the company may have a Twitter® handle that the company uses to post tweets to Twitter®. Each of posts 108 may be associated with one or more responses 110, which may include comments, likes, shares, retweets, or any other tangible and measurable response to post 108.

Posts 108 and responses 110 may be collected from social network servers 104 using one or more of known methods of data collecting. In some cases, training module 112 uses a list of universal resource locators (URLs). Collecting may include sending Hyper-text Transfer Protocol (HTTP) requests to retrieve the posts and responses from the Internet. Other data protocols, formats, and sources may also be used to collect posts 108 and responses 110.

Binning module 116 is employed to automatically bin posts 108 into different post classes 202. Posts 108 are binned into different post classes 202 based on the number of the responses 110 to each post 108. In some implementations, post classes 202 include at least two different classes of posts: a popular post class and an unpopular post class. In this case, the popular post class includes a subset of posts 108 that received a high number of responses 110, whereas the unpopular post class includes a different subset of posts 108 that received a low number of responses 110. In some implementations, post classes 202 may also include an average post class that includes an additional subset of posts 108 that received more responses that the posts in the unpopular posts class but fewer responses than the posts in the popular post class. It is to be appreciated, however, that binning module 116 may bin the posts into any number of different post classes 202.

Marketers and businesses may be most interested in the subset of posts 108 binned into the popular post class because the popular posts can help predict whether a proposed post will receive a high number of responses, and potentially go "viral". Responses to short-text posts, however, have a class imbalance because many short-text posts receive a low number of responses, whereas very few short-text posts receive a high number of responses. This may be at least partially due to the fact that it is easy to post in social media because each post can be short in length.

To account for this class imbalance, binning module 116 can be configured to use Otsu thresholding techniques to find a boundary between posts 108 in the popular post class, and the remainder of posts 108. Otsu thresholding is conventionally used in image processing to automatically perform histogram shape-based image thresholding. Thus, binning module 116 can apply Otsu thresholding to a histogram of the response data of posts 108 to bin posts 108 into the different post classes 202 based on the number of responses to each post.

To perform Otsu thresholding, binning module 116 may first normalize the number of responses 110 received for each post 108. To do so, binning module 116 divides the total number of responses 110 for each post by the total number of members, or subscribers, of the social network community. Consider, for example, a first company that has 10,000 fans of their Facebook® page, and a second company that has just 100 fans. In this example, a post that receives 20 likes may be considered a popular post for the second company because 20% of the second company's fans responded, but may be considered an unpopular post for the first company because just 0.2% of the first company's fans responded.

After normalizing responses 110, binning module 116 repeatedly applies Otsu thresholding techniques to the normalized responses to bin the posts into the different post classes 202. To do so, prediction module 114 applies Otsu thresholding techniques to an image histogram of the normalized responses of each post to identify an elbow point at which there are two significant distributions. The elbow point between the two significant distributions corresponds to a boundary between the posts in the popular post class, and the remainder of the posts. In some implementations, the popular post class includes approximately 10% of posts 108.

Figure 3:
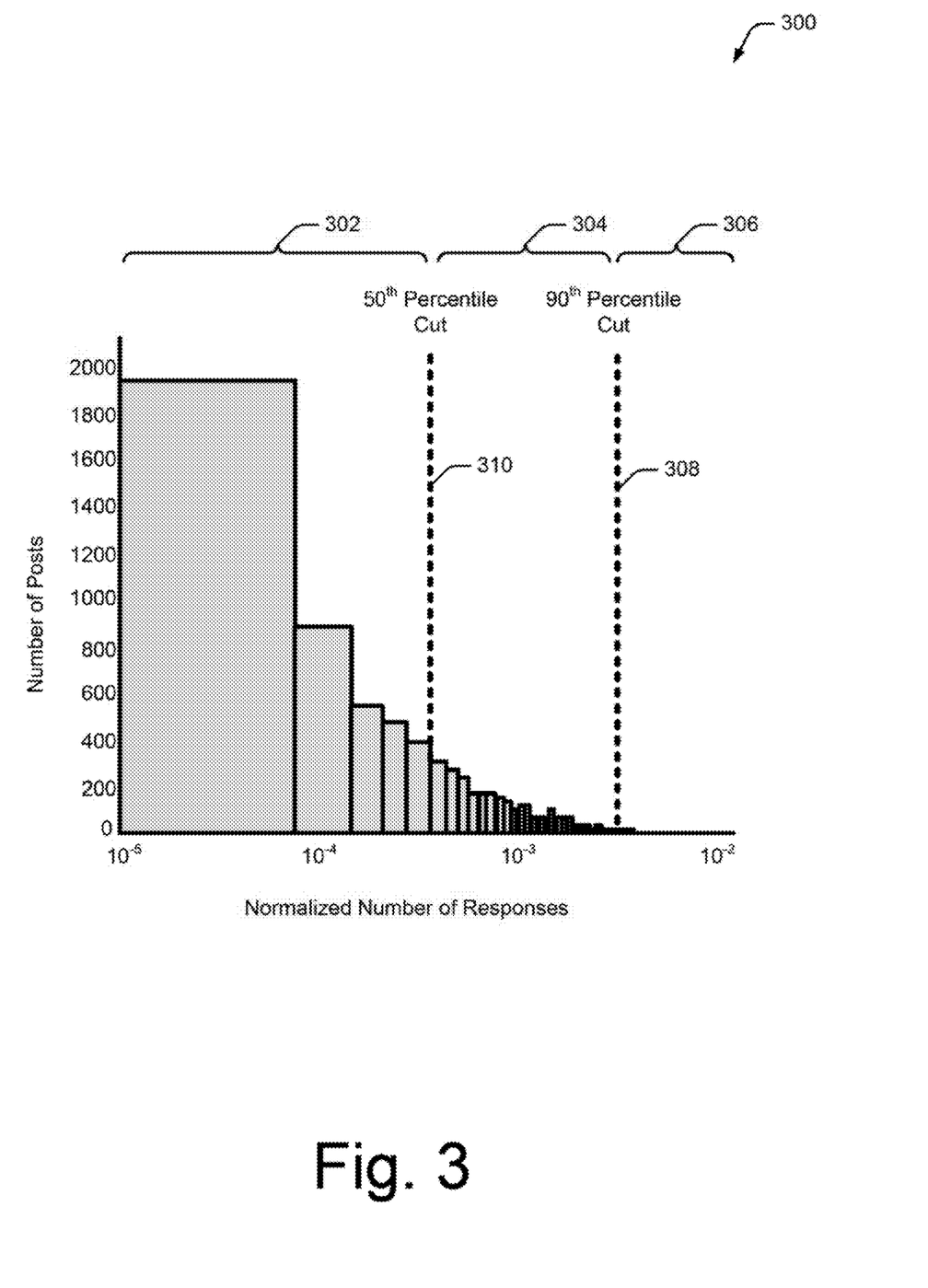
FIG. 3 illustrates an example histogram of normalized responses to posts in the log-scale.

Consider for example, FIG. 3 which illustrates an example histogram 300 of normalized responses 110 to posts 108 in the log-scale. The normalized responses can include a combination of different types of responses, or a single type of response. For example, the normalized responses can include a combination of likes and comments, or just one of likes or comments.

In this example, the posts have been binned into three different classes: an unpopular post class 302, an average post class 304, and a popular post class 306. Popular post class 306, in this example, includes 10% of posts 108 that received the highest number of responses 110. Using Otsu thresholding techniques, a first boundary 308 is calculated that separates the top 10% of posts into popular post class 306. In order to generate average post class 304 and unpopular post class 302, a second boundary 310 can be calculated by taking a median of the entire sample set of posts 108. As illustrated in FIG. 3, second boundary 310 separates unpopular post class 302 and average post class 304.

Prior, during, or after the posts are binned by binning module 116, a feature-extraction module 118 is employed to extract features 204 from posts 108. Due to the short length of posts 108, extracting normal textual features may not provide enough data to form the prediction model. Thus, feature model 118 can be configured to extract non-textual features 204 from posts 108, such as a length of the post, a time of day or week of the post, a duration of time since a last post, a frequency of posts, a sentiment of the post, and/or a type of the post.

The length of the post may be measured in terms of the number of characters, or the number of words, in the post. This feature may affect the popularity of the post. For example, for a given social network community, shorter posts may be more popular than longer posts.

The time of day or week of the post corresponds to an hour of the day and/or a day of the week at which the post was posted. This feature may also affect the popularity of the post. For example, posts that are posted on Sunday evenings may generally be more popular than posts that are posted on Tuesday afternoons.

The duration of time since the last post can be measured in terms of a duration of time between the last post, and a current proposed post, and can be measured in minutes, hours, days, and/or weeks. The frequency of posts may be measured in terms of the number of posts within a given time period, such as within a 24 hour time period, a 48 hour time period, or a 1 week time period. The duration of time since the last post and the frequency of posts may also affect the popularity of the post. For example, posting too many posts during a given period of time may affect the popularity of the post because users may be less likely to respond to more than one post during the given period of time.

The sentiment of a post may be measured in terms of subjective information about the response to a post, such as an attitude, opinion, or emotion of the social network community to the post. In some cases, the posts can be submitted to third party sentiment classifier software that evaluates the positive or negative expression of a response based on each term in the response.

Hotness of topic measures the hotness, or trendiness, of the topic of a post. In some cases, the hotness of topic can be calculated as a vector of three variables: 1) the absolute value of a trend graph for the topic on a search engine (e.g., Google), 2) the change in a trend graph of the topic from the previous day, and 3) the absolute error from a polynomial curve fit. Of course, the hotness of topic may also be calculated using other techniques.

Newness of Topic measures the newness of the topic of a post. In some cases, the newness of topic can be calculated as a vector of three variables: a weighted frequency of news articles containing terms in the post over the last 24 hours, over the last 3 days, and over the last week. The newness of topic, however, may also be calculated using other techniques.

The type of post can be measured in terms of whether the post is an interrogative post and/or whether the post includes an image, a video, or any other type of attachment. Interrogative posts may be determined by the presence of a question mark in the post. A post that asks a question may cause the post to receive a greater number of comments because users may submit answers to the question. Whether a post includes a picture, or a video, may also affect the response to the post. For example, posts that include a picture may include a greater number of likes by users than posts the do not include a picture. Also, a post including a video may generate a high number of clicks on the post, as users select the video for viewing.

In some implementations, feature-extraction module 118 may also be configured to extract textual features 204 from posts 108, such as a differential term frequency-inverse document frequency (Diff-TFIDF) of the post.

Diff-TFIDF captures the effect of individual words in a post, controlling for commonly used words. In some implementations, the Diff-TFIDF can be calculated as follows:

$$\text{Diff-TFIDF} = \text{TF} \times (\text{IDF}_{pos} - \text{IDF}_{neg})$$

In this formula, $\text{IDF}_{pos}$ is the inverse document frequency of the posts in the popular post class (e.g., the posts with a high number of responses) and $\text{IDF}_{neg}$ is the inverse document frequency of the posts in the unpopular post class (e.g. the posts with a low number of responses). For multiple bins, the Diff-TFIDF can be evaluated for posts in each bin against posts in the other bins.

While not illustrated in FIG. 2, in some implementations, de-biasing module 120 can be employed to de-bias responses 110. De-biasing responses 110 removes any inherent bias in the social network community's responses. For example, the de-biasing may modify responses 110 based on how negative or positive a community is in general. Thus, if a community is generally very negative regardless of the topic of a post, a neutral response or even a slightly negative response to a post may be considered to be positive.

The different post classes 202 and extracted features 204 are then passed to classifier module 122. Classifier module 122 applies a learning model to the different posts classes 202 and extracted features 204 to form a prediction model 206. For example, the learning model attempts to learn which of extracted features 204 cause a post to be classified as popular or unpopular. Subsequently, prediction model 206 can be used to predict the number of response to a proposed post prior to the proposed post being posted.

Classifier module 122 can apply any type of learning model to the different posts classes 202 and extracted features 204, including regression models, classification models, and ranking models. In some implementations, classifier module 122 uses a support vector machine (SVM) learning model, a Random Forest learning model, or a Maximum Entropy (MaxEnt) learning model to generate prediction model 206. These learning models are known in the art, and thus are not discussed in more detail herein.

Figure 4:
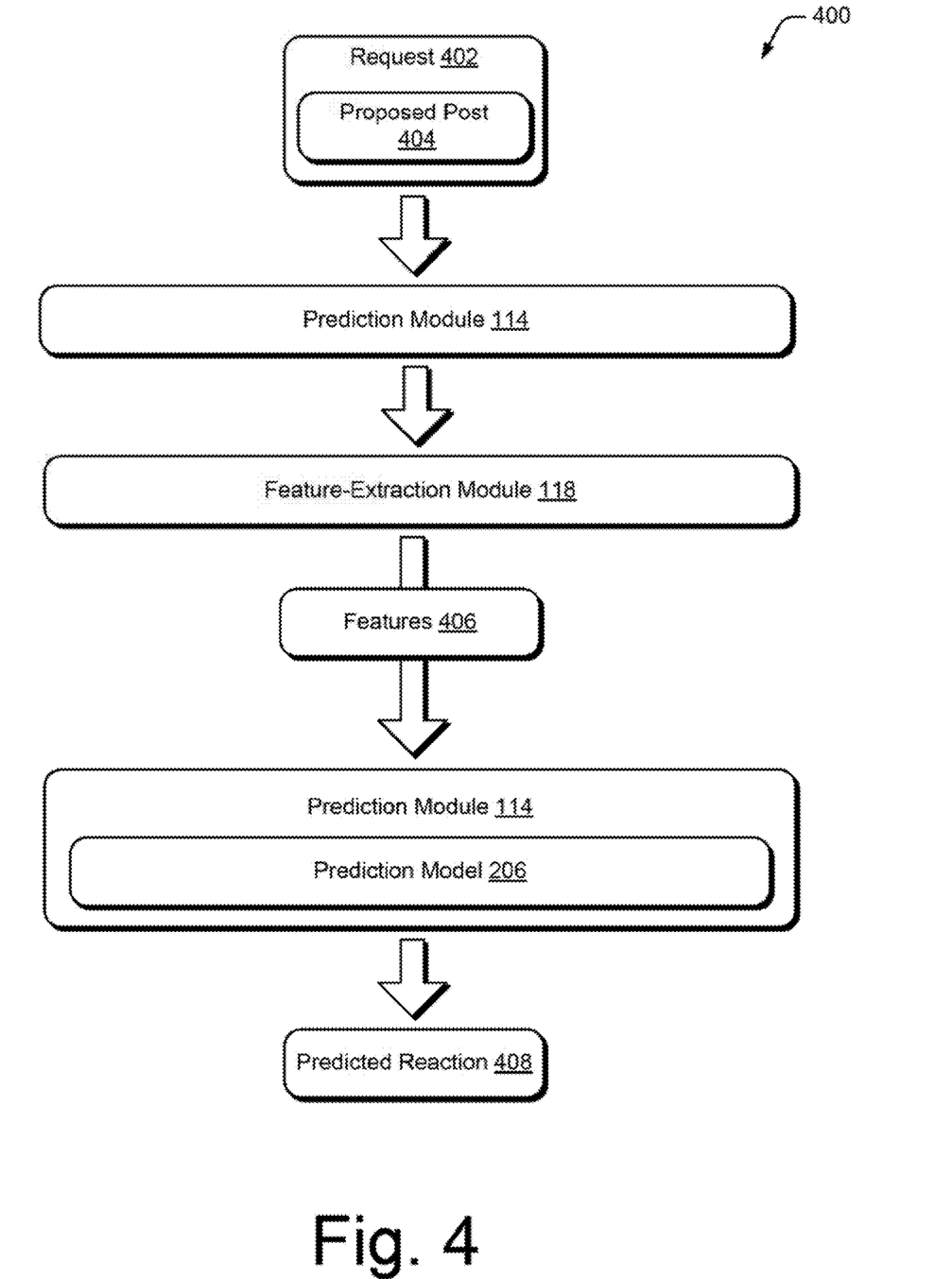
FIG. 4 illustrates a system in an example implementation in which a social network community's reaction to a proposed post is predicted using the prediction model formed in FIG. 2.

FIG. 4 illustrates a system 400 in an example implementation in which a social network community's reaction to a proposed post is predicted using prediction model 206. In this example, a request 402 is received by prediction module 114 to predict a reaction, by the social network community, to a proposed post 404 prior to the proposed post being posted to the social network. For example, after creating a post intended to be posted to a social network community, such as company's Facebook® page or Twitter® feed, a user can initiate request 402 by selecting a "predict reaction" control. The predict reaction control can be integrated into a user interface of the social network, or may be implemented in a separate user interface.

When request 402 is received, prediction module 114 passes proposed post 404 to feature-extraction module 118 which is employed to extract features 406 from proposed post 404. Extracted features 406 are the same type of features as extracted by feature-extraction module 118 from posts 108, as described above. Thus, extracted features 406 can include non-textual features such as a length of proposed post 404, a time of day or week of proposed post 404, a duration of time since the last post, a frequency of posts, a sentiment of proposed post 404, a hotness of topic of proposed post 404, a newness of topic of post 404, and/or a type of proposed post 404. Extracted features 406 can also include textual features, such as a differential term frequency-inverse document frequency (Diff-TFIDF) of proposed post 404.

Prediction module 114 is then employed to generate a predicted reaction 408 to proposed post 404 by comparing extracted features 406 of proposed post 404 to the extracted features associated with the different post classes of prediction model 206. Based on this comparison, prediction module 114 selects the post class that includes features that are most similar to features 406 of proposed post 404. The selected post class can then be used by prediction module 114 to generate predicted reaction 408 by predicting a reaction by the social network community based on a number of responses received by posts in the selected post class.

In some cases, predicted reaction 408 indicates a predicted number of responses that proposed post 404 will receive. This predicted number is similar to the number of responses received by the posts in the selected post class. The predicted number of responses that the proposed post will receive can be based on one or more of a predicted number of comments the proposed post will receive, a predicted number of likes the proposed post will receive, a predicted number of shares the proposed post will receive, a predicted number of tweets the proposed post will receive, or a predicted number of replies the proposed post will receive. Alternately or additionally, predicted reaction 408 indicates whether the post will be popular or unpopular.

For example, if the popular post class is selected, then prediction module 114 predicts that proposed post 404 will also be popular and/or will receive a similar number of responses as were received by the posts in the popular post class. Similarly, if the unpopular post class is selected, then prediction module 114 predicts that proposed post 404 will also be unpopular and will receive a similar number of responses as were received by the posts in the unpopular post class.

In some implementations, prediction module 114 determines a prediction probability for each post class, and selects the post class with the highest prediction probability. Consider, for example, that prediction module 114 determines a prediction probability of 0.7 that proposed post 404 will correspond to the popular post class, a prediction probability of 0.2 that proposed post 404 will correspond to the average post class, and a prediction probability of 0.1 that proposed post 404 will correspond to the unpopular post class. In this example, prediction module 114 will select the popular post class for proposed post 404 because the prediction probability associated with the popular post class is the highest.

Prediction module 114 then renders predicted reaction 408 for display. Based on predicted reaction 408, the user can determine whether or not to post proposed post 404 to the social network. For example, a predicted reaction 408 indicating that proposed post 404 will be a popular post may cause the user to proceed with posting proposed post 404. Alternately, a predicted reaction 408 indicating that proposed post 404 will be an unpopular post may cause the user to reconsider whether to post proposed post 404 to the social network community.

In some implementations, prediction module 114 includes the prediction probability with the rendering of predicted reaction. This provides the user with additional information to help the user determine the likelihood that the predicted reaction will be correct.

Example Procedure

The following discussion describes techniques for predicting reactions to short-text posts that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
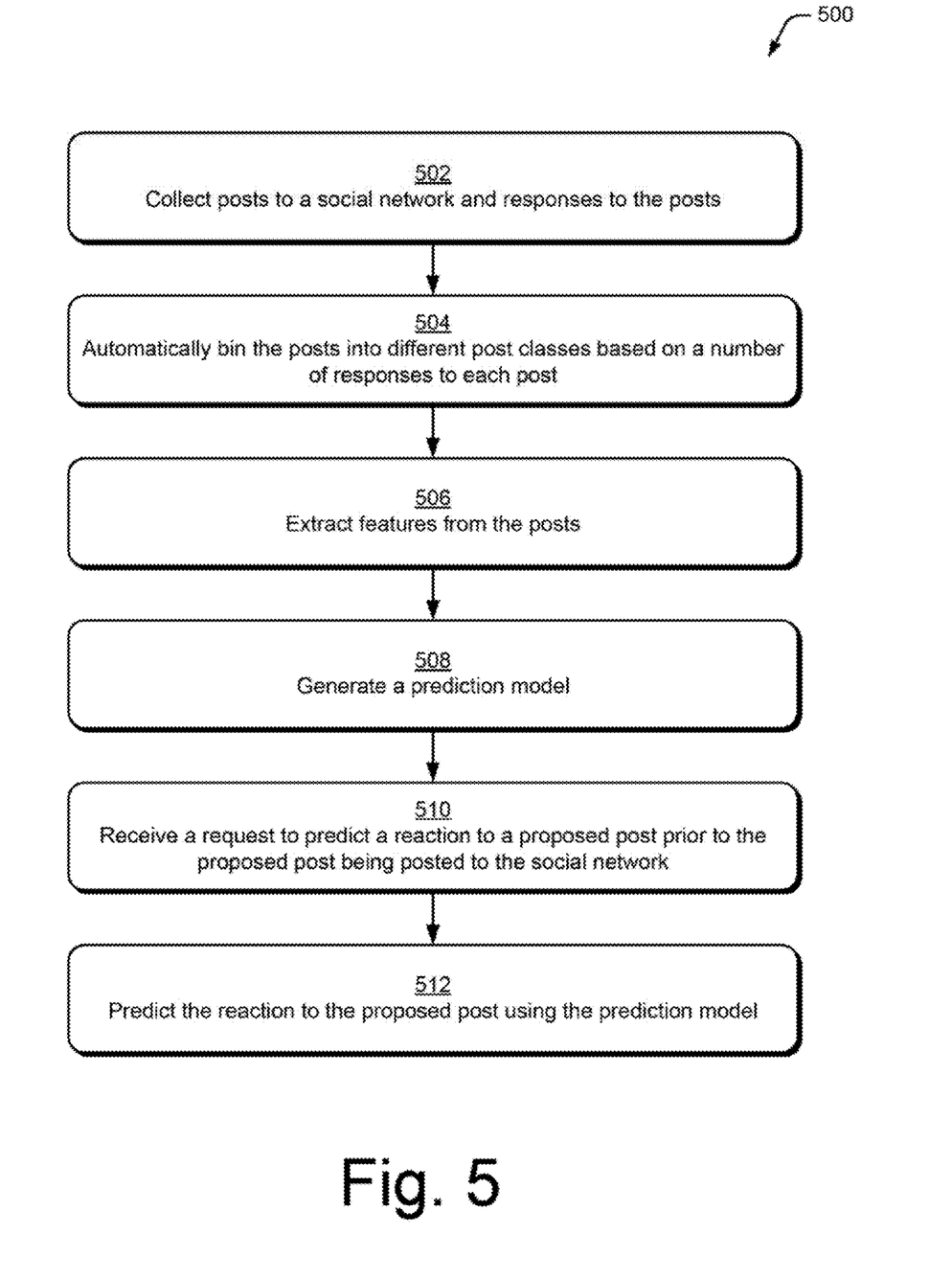
FIG. 5 illustrates a procedure in an example implementation in which a prediction model is formed and then used to predict a social network community's reaction to a proposed post.

FIG. 5 illustrates a procedure 500 in an example implementation in which a prediction model is generated and then used to predict a social network community's reaction to a proposed post.

At 502, posts to a social network and responses to the posts are collected. As shown in FIG. 2, for instance, posts 108 and responses 110 to the posts are collected by training module 112 from social network servers 104.

At 504, the posts are automatically binned into different post classes based on a number of the responses to each post. As shown in FIG. 2, for example, binning module 116 can be employed to automatically bin posts 108 into different post classes 202. In some implementations, post classes 202 include at least two different post classes: a popular post class and an unpopular post classes. As described above, binning module 116 may uses Otsu thresholding techniques to bin the posts into the different post classes.

At 506, features are extracted from the posts. As shown in FIG. 2, for example, feature-extraction module 118 can be employed to extract features 204 from posts 108. Feature-extraction module 118 can be configured to extract non-textual features from the posts, such as length of the post, time of day or week of the post, duration of time since the last post, frequency of posts, sentiment of posts, and/or type of post. In some implementations, feature-extraction module 118 may also be configured to extract textual features from the posts such as hotness of topic, newness of topic, or differential term frequency-inverse document frequency (Diff-TFIDF).

At 508, a prediction model is generated by applying a learning model to the different post classes and the extracted features. For example, as shown in FIG. 2, classifier module 122 can apply a learning model to the different posts classes 202 and extracted features 204 to form a prediction model 206.

At 510, a request is received to predict a reaction to a proposed post prior to the proposed post being posted to the social network. As illustrated in FIG. 4, for example, a request 402 can be received by prediction module 114 to predict a reaction, by the social network community, to a proposed post 404 prior to the proposed post being posted to the social network community.

At 512, the reaction to the proposed post is predicted using the prediction model. As illustrated in FIG. 4, for example, prediction module 114 can be employed to generate a predicted reaction 408 to proposed post 404 by comparing extracted features 406 of proposed post 404 to the extracted features associated with the different post classes of prediction model 206. Based on this comparison, prediction module 114 selects the post class that includes features that are most similar to the features of the proposed post. The selected post class can then be used by prediction module to generate the predicted reaction.

Having described example procedures in accordance with one or more implementations, consider now an example system and device that can be utilized to implement the various techniques described herein.

Example System and Device

FIG. 6 illustrates an example system generally at 600 that includes an example computing device 602 that is representative of one or more computing systems and/or devices that may implement the various techniques described herein. This is illustrated through inclusion of training module 112 and prediction module 114, which operates as described above. The computing device 602 may be, for example, a server of a service provider, a device associated with a client (e.g., a client device), an on-chip system, and/or any other suitable computing device or computing system.

The example computing device 602 is illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device implementation, implementation of functionality described herein may be distributed throughout the system 600. For example, the functionality may be implemented in part on the computing device 602 as well as via the platform 616 that abstracts the functionality of the cloud 614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media comprising instructions stored thereon that, responsive to execution by a computing device, cause the computing device to perform operations comprising:
   collecting posts to a social network and responses to each post by a social network community;
   binning the posts into different post classes based on a number of the responses to each post, the binning comprising normalizing the number of the responses to each post by dividing the number of the responses to each post by a total number of subscribers of the social network community, generating a histogram of the normalized number of responses to each post, applying Otsu thresholding techniques to the histogram to identify one or more boundaries between distributions of the posts in the histogram, and binning at least one of the distributions of the posts into a popular post class that includes posts that received a high number of responses;
   extracting features from the posts, the extracted features including at least one non-textual feature; and
   forming a prediction model by applying a learning model to the different classes of posts and the extracted features.

2. The one or more computer-readable storage media of claim 1, wherein the binning further comprises binning at least one of the distributions of the posts into an unpopular post class that includes posts that received a low number of responses.

3. The one or more computer-readable storage media of claim 1, wherein the popular post class includes approximately 10% of the collected posts.

4. The one or more computer-readable storage media of claim 1, wherein the at least one non-textual feature comprises one of: a length of the post, a time of day or week of the post, a duration of time since a last post, a sentiment of the post, a hotness of topic of the post, a newness of topic of the post, or a type of the post.

5. The one or more computer-readable storage media of claim 1, wherein the extracted features further include at least one textual feature.

6. The one or more computer-readable storage media of claim 1, wherein the extracted features further include a differential term frequency-inverse document frequency (Diff-TFIDF) of each post.

7. The one or more computer-readable storage media of claim 1, wherein the learning model comprises one of a support vector machine (SVM) learning model or a Random Forest learning model.

8. The one or more computer-readable storage media of claim 1, wherein the posts comprise short-text posts.

9. The one or more computer-readable storage media of claim 1, wherein the responses to each post comprise one or more of comments, likes, shares, retweets, or replies.

10. A system comprising:
one or modules implemented at least partially in hardware, the one or more modules configured to perform operations comprising:
binning posts into different post classes of a prediction model based on a number of the responses to each post, the binning comprising normalizing the number of the responses to each post by dividing the number of the responses to each post by a total number of subscribers of a social network community, generating a histogram of the normalized number of responses to each post, applying Otsu thresholding techniques to the histogram to identify one or more boundaries between distributions of the posts in the histogram, and binning at least one of the distributions of the posts into a popular post class that includes posts that received a high number of responses;
receiving a request to predict a reaction, by the social network community, to a proposed post prior to the proposed post being posted;
extracting one or more features from the proposed post;
comparing the one or more extracted features of the proposed post to features associated with the different post classes of the prediction model;
selecting a post class of the different post classes that includes features that are most similar to the extracted features of the proposed post; and
predicting the reaction by the social network community to the proposed post based on a number of responses received by posts in the selected post class.

11. The system of claim 10, wherein the predicted reaction indicates a predicted number of responses that the proposed post will receive, the predicted number of responses being similar to the number of responses received by posts in the selected post class.

12. The system of claim 11, wherein the predicted number of responses that the proposed post will receive is based on one or more of a predicted number of comments the proposed post will receive, a predicted number of likes the proposed post will receive, a predicted number of shares the proposed post will receive, a predicted number of tweets the proposed post will receive, or a predicted number of replies the proposed post will receive.

13. The system of claim 10, wherein the predicted reaction indicates whether the post will be popular or unpopular.

14. The system of claim 10, wherein the posts comprise short-text posts.

15. The system of claim 10, wherein the one or more extracted features include at least one non-textual feature.

16. The system of claim 10, wherein the one or more extracted features includes at least one textual feature.

17. A method comprising:
collecting posts to a social network and responses to each post;
automatically binning the posts into different post classes based on a number of the responses to each post, the binning comprising normalizing the number of the responses to each post by dividing the number of the responses to each post by a total number of subscribers of the social network community, generating a histogram of the normalized number of responses to each post, applying Otsu thresholding techniques to the histogram to identify one or more boundaries between distributions of the posts in the histogram, and binning at least one of the distributions of the posts into a popular post class that includes posts that received a high number of responses;
extracting features from the posts;
generating a prediction model by applying a learning model to the different post classes and the extracted features;
receiving a request to predict a reaction to a proposed post prior to the proposed post being posted to the social network; and
predict the reaction to the proposed post using the learning model.

18. The method of claim 17, wherein the extracted features include at least one non-textual feature.

19. The method of claim 17, wherein the extracted features include at least one of a length of the post, a time of day or week of the post, a duration of time since a last post, a sentiment of the post, a type of the post, a hotness of topic of the post, a newness of topic of the post, or a differential term frequency-inverse document frequency (Diff-TFIDF) of each post.

20. The method of claim 17, wherein the posts comprise short-text posts.

* * * * *